Dec. 20, 1960   P. J. LISSARRAGUE   2,965,336
DEVICE FOR FORMING AN OPENING IN A METALLIC PANEL
Filed March 26, 1957   2 Sheets-Sheet 1
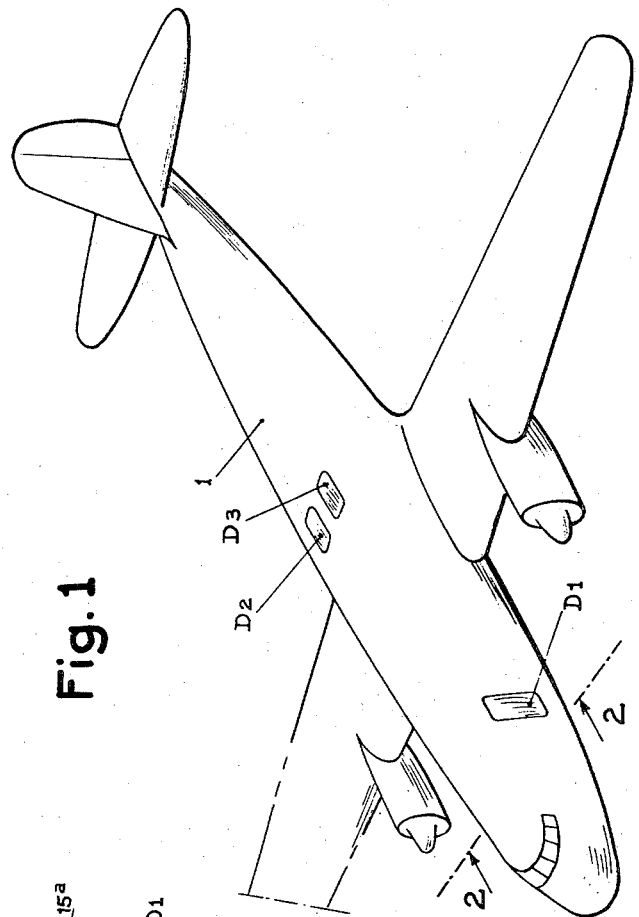
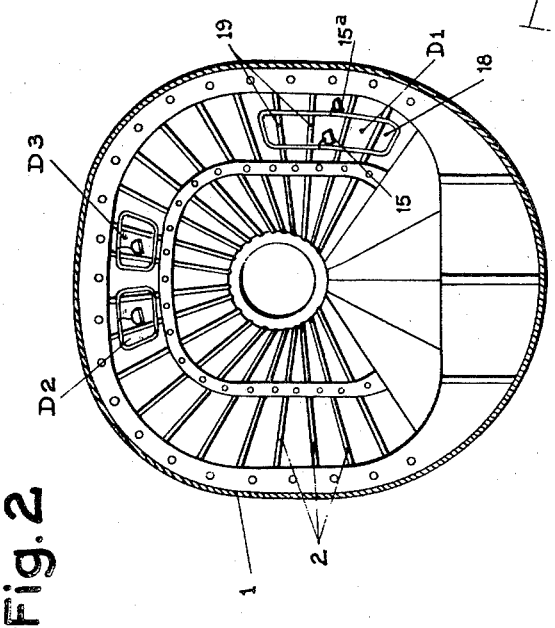
INVENTOR
PIERRE JULES LISSARRAGUE
By A. John Michel
ATTORNEY Dec. 20, 1960 P. J. LISSARRAGUE 2,965,336
DEVICE FOR FORMING AN OPENING IN A METALLIC PANEL
Filed March 26, 1957 2 Sheets-Sheet 2
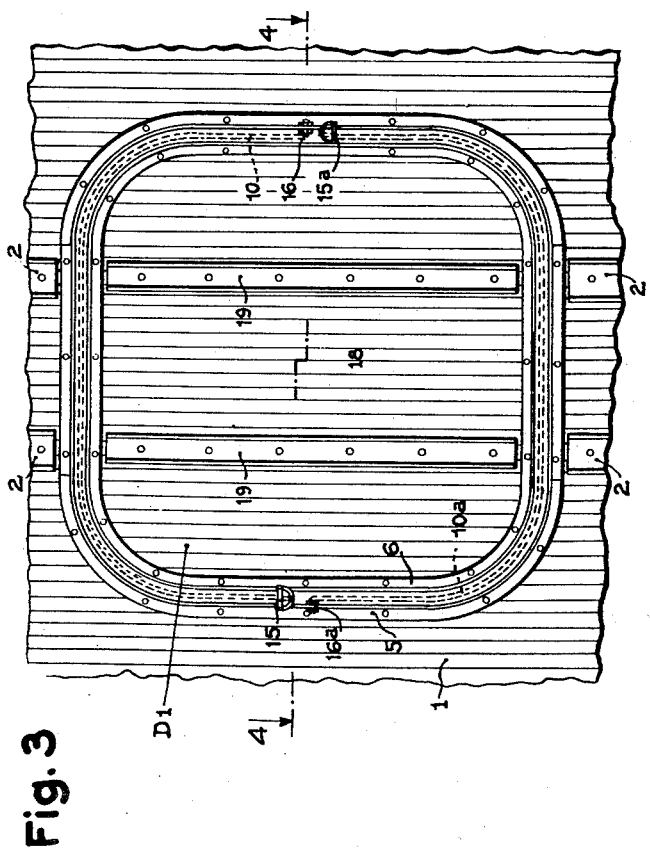
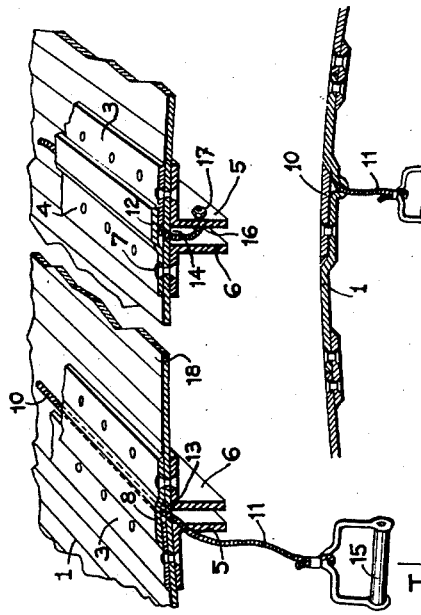
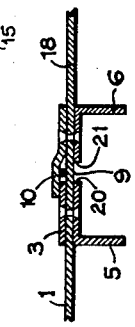
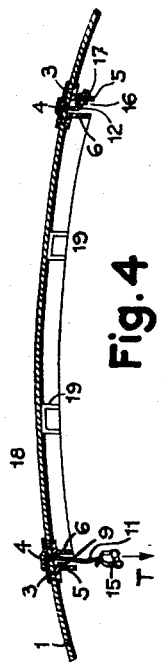
INVENTOR
PIERRE JULES LISSARRAGUE
By A. John Michel
ATTORNEY

# United States Patent Office 2,965,336
Patented Dec. 20, 1960

2,965,336

DEVICE FOR FORMING AN OPENING IN A METALLIC PANEL

Pierre Jules Lissarrague, French Embassy, Villalar 2, Madrid, Spain

Filed Mar. 26, 1957, Ser. No. 648,635

Claims priority, application France Mar. 30, 1956

7 Claims. (Cl. 244—129)

The present invention relates to devices for rapidly forming a safety or emergency opening or exit by ripping open a wall or panel made of light alloy such as the metallic wall constituting the body of an aircraft or other vehicle or device, and in particular in an aircraft such as a private, commercial or military aircraft with a housing which may but need not be pressurized.

It is well known that the rules of air navigation require that an aircraft be provided with a minimum number of safety exits, but the exits of known construction cannot be numerous because they are rather complex in order to fulfill the requirements of safety, of mounting, of closing, of casting off and of tightness, each requirement involving an increase in weight.

Independently of the drawbacks resulting from unwanted casting off in flight of the safety exit, it may occur that in case of forced landing or of forced contact with water, deformation of the aircraft body blocks or prevents the opening of such safety exits.

There are generally provided on board of aircraft axes for cutting safety or emergency openings along lines marked on the body of the aircraft, but it has been proven that the destruction of a part of the aircraft body to provide an exit is difficult and lengthy.

The invention has therefore for its object to provide an improved device for rapidly forming a safety exit by ripping open a wall or panel made of light alloy which constitutes the fuselage or housing of an aircraft, of another vehicle or of any device in which the provision of safety exits is necessary.

An important feature of the invention resides in that a high resistance wire of small cross section is installed in a housing, for example, on the outer surface of a wall or panel forming part of the housing, at least one end of the wire extending into the housing of the aircraft and being connected with handle. A portion of the wire, remote from its just mentioned end, is fixed to a point preferably within the said housing.

The panel or wall is cut or ripped as a result of the manual effort exerted on the handle and hence on the wire which subjects the wall to a shearing action and thus cuts in the wall an opening constituting the wanted safety or emergency exit.

The above described construction has the following advantages:

It overcomes the difficulties resulting from the mounting and closing of known emergency or safety exits.

The structural resistance of the aircraft or other device is not affected; therefore, such devices may be provided with several safety exits without reducing their strength.

The airtightness of the wall provided with such safety exits remains unaltered before an opening is actually cut into the wall since the opening or openings are formed only when the occupants of device desire to use the safety exit or exits.

The danger of unintentional casting off of the safety exit door is eliminated since the opening used as safety exit is provided only in case of necessity.

In addition, the system of forming a safety exit or opening in accordance with the present invention is simple, of lightweight construction, and quick in operation. By way of example, it is possible to cut in a few seconds an opening with the area of one square meter in a wall of a thickness of 0.6 mm. by utilizing a wire of 1 mm. in diameter.

The invention has also for its object the provision of an aircraft or other apparatus whose housing embodies in at least one of its walls the improved exit forming device.

Other features will appear from the following description of certain embodiments selected for illustration in the accompanying drawings in which:

Fig. 1 is perspective view of an aircraft provided with three devices for forming safety exits in its body;

Fig. 2 is an enlarged transverse cross-section taken on line 2—2 of Fig. 1;

Fig. 3 is enlarged from elevational view of one of the exit forming devices shown in Figs. 1 and 2, as seen from within the aircraft housing;

Fig. 4 is a transverse cross-section taken along line 4—4 of Fig. 3;

Fig. 5 is enlarged perspective view of the device shown in Fig. 4;

Fig. 6 is cross-sectional view of a modification; and

Fig. 7 illustrates a further modification according to which the exit forming device is so constructed that the outer surface of the wall embodying the device remains smooth.

In Figs. 1 and 2, the novel device is installed in the body or housing of an aircraft; the housing or fuselage having a preferably continuous wall or panel made of a suitable light alloy and reinforced by structural members or ribs 2.

By way of example, this fuselage comprises three safety exit forming devices D¹, D² and D³ which, in accordance with my invention constitute means for quickly providing three openings or cutouts in the wall 1.

The device D¹ is shown in greater detail in Figs. 2 to 5. It comprises a pair of frames for guiding the cutting or ripping wires in the aircraft wall, these frames or guide means consisting of laminations 3, 4, 5 and 6.

Laminations or plates 3 and 4 are fixed to the outer surface or side of the light alloy wall 1, and The laminations 5 and 6 are fixed to the inner side or surface of said wall.

Laminations 3, 5 and 4, 6, respectively, are connected with each other by rivets 7, as shown in Fig. 5, or they may be connected by soldering, gluing or in any other suitable way.

Outer laminations or plates 3 and 4 consist, respectively, of a thin sheet and of a sheet whose central part is bent over twice in reversed directions. Thus, sheet or plate 4 consists of two parallel strips or portions one of which is fastened to the outer surface of wall 1 and the other of which extends over the adjacent plate or lamination 3, and of the aforementioned central part between the two strips. The central part and that strip or portion of lamination 4 which is fastened to panel 1 define with the latter and with plate 3 on endless channel 8 for the ripping or cutting wire or wires.

The two inner laminations 5 and 6 consist of two L-shaped angle-irons. The portions or legs of members 5 and 6 which are perpendicular to the wall 1 are slightly spaced from each other to form a free passage 9 which is disposed in mirror reverse with respect for the enclosure or channel 8.

The laminations 3–6 defining the channel 8 and the channel or space 9 are disposed about the periphery of a square with rounded corners, as is best shown in Fig. 3, channel 8 and channel 9 thus forming two endless paths for the ripping wire or wires.

In the channel 8 are located two cutting elements 10, 10a made of a wire having a high resistance, for example, steel wire with a diameter of about one millimeter. Each of these wires or cutting elements extends substantially along one half of the length of channel 8.

The two ends or extremities 11 and 12 of wire 10 extend into the fuselage, that is to say into the space 9 between laminations 5 and 6, the panel or wall 1 for this purpose being provided with two small holes 13 and 14, respectively.

The extremity 11 of wire 10 is connected with a handle 15 which is grasped by a person wishing to escape from the aircraft and pulled in a direction at right angles to and away from wall 1, as indicated by arrow "T" in Figs. 4 and 5. The other extremity 12 of wire 10 is fixed to the panel 1 or lamination 5, for example, and as shown in Fig. 5, by means of a bolt 16 and a nut 17.

The other wire 10a is mounted in analogous manner by having one of its extremities connected to the handle 15a which latter is preferably located adjacent to the bolt 16 and nut 17 fixed to the extremity 12 of wire 10. Bolt 16a which fixes the other extremity of wire 10a to lamination 5 is adjacent to the handle or handgrip means 15.

Portion 18 of the wall or panel 1 which is located within the frame formed by laminations 3-6 constituting guide means for cutting wires is preferably reinforced by ribs 19. The latter may or may not be of the same type as members 2 shown in Fig. 2 and are fixed to the inner surface of panel portion 18. For the sake of simplicity, Fig. 3 shows only two reinforcing ribs 19 in the device D¹ while Fig. 2 shows that the device D¹ comprises four such ribs.

During normal flight of the aircraft, each of safety exit forming devices D¹, D², D³ is in its position shown in Figs. 1 to 5. That portion of wall 1 which surrounds the fuselage is continuous, the panel 18 within the guiding frame 3-6 constituting an integral part of said wall portion. There is no interruption between panel portion 18 and surrounding panel 1, the said wall in fact only having two pairs of small holes such as 13 and 14 for the passage of extremities 11, 12 of wire 10 and similar holes for the extremities of wire 10a. These small holes are covered by the lamination 4 which overlaps the lamination 3.

It will be seen that airtight sealing of the fuselage and the resistance of the wall 1 are not affected by the provision of devices D¹, D² and D³ as the guiding frames 3-6 actually reinforce the housing of a so-constructed aircraft. The small holes for the extremities of wires 10, 10a may be closed by a suitable sealing substance, if desired.

In case of emergency, the personnel or passengers occupying the aircraft may very quickly escape from the aircraft by providing almost instantaneously openings in the walls or panels surrounding the fuselage by utilizing one or each of the devices D¹, D², D³. It suffices to subject the handle 15 or 15a to a force in the direction of arrow T in order to pull the wire 10 and/or 10a through the wall 1 between laminations 3, 5 and 4, 6. When the handle or handles are pulled in such direction, channel 8 which normally receives wires 10, 10a and the channel or space 9 between laminations 5 and 6 guide the cutting elements in such manner as to separate the panel portion 18 from surrounding wall 1.

Wire 10 cuts or rips the wall or panel 1 from hole 13 to hole 14 and the other wire will cut the wall between the other pair of holes through which its extremities extend. Both ripping wires may be extracted simultaneously either by a single person using both hands, by two persons, or successively by a single person. The panel portion 18 is cut away completely and leaves in this way a large safety exit. It will be noted that each of the two smaller safety devices D² and D³ is provided with a single ripping wire and a single handgrip member.

Fig. 6 illustrates a modification according to which the two inner angle irons 5 and 6 are mounted in a manner different from that of members 5, 6 shown in Figs. 4 and 5. The end faces 20 and 21 of the portions or legs of angle iron which are fixed to the wall 1 define the passage or channel 9 intended to guide the cutting wire 10.

In Fig. 7 the sections of wall 1 are so formed as to define recesses for a single outer lamination which is riveted to the respective wall sections. No inner laminations are used in this embodiment because the single outer lamination and the wall sections define a channel for the cutting wire 10 whose end 11 is fixed to the handle 15. This construction is particularly suitable for use in jet aircraft because the wall 1 and the single outer lamination offer a smooth, continuous outer surface.

Of course, the invention is in no way limited to the embodiments shown and described, which have been given merely by way of example. The use of two wires 10 and 10a constitutes great advantage in that they enable the user or users to quickly form an opening in case an emergency exit may become necessary. As above stated, the two wires may be extracted simultaneously, if necessary. Also, to form openings of relatively small areas, there may be provided only one wire the two extremities of which may be brought close together and may extend into the cockpit through a single hole provided in the wall 1.

If larger openings or safety exits should be necessary, more than two wires may be used for a single opening.

While I have illustrated and described certain preferred embodiments of my invention, it should be understood that additional changes and modifications will readily occur to persons skilled in the art without departing from the spirit and scope of the invention as defined in the following claims.

What I claim is:

1. In an aircraft fuselage, the combination of a panel of metallic material having an inner side and an outer side with a device for forming an opening in said panel, said device comprising first guide means fixed to the outer side of the panel and defining a closed outer endless channel, second guide means fixed to the inner side of the panel and defining an open inner endless channel separated by the panel from said outer channel, the channels extending along the periphery of a panel portion within said guide means, and means for removing said panel portion comprising two ripping wires each having a first end fixed to the panel at spaced points adjacent to said channels, each wire thereupon extending in said outer channel toward the first end of the other wire and concealed by said first guide means, and each wire having a second end passing through the panel into the fuselage at a point close to the first end of the other wire, and handgrip means connected to the second end of each wire in the fuselage, the device operating in such manner that, when a force is applied to said handgrip means in a direction away from said panel each wire is guided in said open inner channel and rips the panel between said channels from the first end of the other wire to its own first end, whereby the wires separate said panel portion and define an opening in the panel.

2. The combination as set forth in claim 1, wherein said panel portion is of substantially rectangular contour.

3. The combination as set forth in claim 1, wherein said panel portion is of substantially circular contour.

4. The combination as set forth in claim 1, wherein said first guide means comprises a first plate fixed to the outer side of the panel and having an end face; and a second plate having a first portion fixed to said outer side of the panel adjacent to the end face of said first plate, a second portion overlapping said first plate, and a bent-over portion between said first and said second portions, said outer channel being defined by said bent-over portion and the end face of said first plate.

5. The combination as set forth in claim 1, wherein said second guide means comprises a pair of L-shaped members each having one leg fixed to said inner side of the panel and a second leg substantially at right angles to the plane of said panel, said inner channel being disposed between the second legs of said members.

6. The combination as set forth in claim 1, wherein said second guide means comprises a pair of angle irons each fixed to the inner side of said panel and each having an end face, said end faces being adjacent to each other and defining said inner channel therebetween.

7. In an aircraft fuselage, the combination of a panel of metallic material having an inner side and an outer side with a device for forming an opening in said panel, said device comprising first guide means fixed to the outer side of the panel and defining a closed outer endless channel, second guide means fixed to the inner side of the panel and defining an open inner endless channel separated by said panel from said outer channel, the channels extending along the periphery of a panel portion within said guide means, and means for removing said panel portion comprising at least one ripping wire having one end fixed to the panel at a point adjacent to said channels, the wire extending in said outer channel and concealed by said first guide means, the wire having a second end passing through the panel into the fuselage, and handgrip means in the fuselage fixed to the second end of said wire, the device operating in such manner that, when a force is applied to said handgrip means in a direction away from said panel, the wire is guided in said open inner channel and rips said panel between the channels from the point of its passing through the panel to said first end thereof.

References Cited in the file of this patent

UNITED STATES PATENTS

| 2,583,669 | Santina | Jan. 29, 1952 |

FOREIGN PATENTS

| 214,198 | Switzerland | July 16, 1941 |
| 262,525 | Italy | Feb. 2, 1929 |
| 317,286 | Great Britain | Aug. 15, 1929 |
| 494,251 | Great Britain | Oct. 24, 1938 |
| 608,479 | Great Britain | Sept. 15, 1948 |